(12) United States Patent
Ku et al.

(10) Patent No.: US 11,209,861 B2
(45) Date of Patent: Dec. 28, 2021

(54) DUAL SIDE DOCKABLE KEYBOARD BASE WITH BI-DIRECTIONAL WIRELESS CHARGING FUNCTION FOR 2 IN 1 DEVICES

(71) Applicant: Intel Corporation, Santa Clara, CA (US)

(72) Inventors: Jeff Ku, Taipei (TW); Gavin Sung, Taipei (TW); Christopher J. Hamlin, Taipei (TW); Ivan By Wang, Taipei (TW); Simon Tsai, Pingzhen (TW)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 16/083,796

(22) PCT Filed: Apr. 1, 2016

(86) PCT No.: PCT/US2016/025743
§ 371 (c)(1),
(2) Date: Sep. 10, 2018

(87) PCT Pub. No.: WO2017/171877
PCT Pub. Date: Oct. 5, 2017

(65) Prior Publication Data
US 2019/0146552 A1 May 16, 2019

(51) Int. Cl.
*G06F 1/16* (2006.01)
*H02J 7/02* (2016.01)
(Continued)

(52) U.S. Cl.
CPC .......... *G06F 1/1632* (2013.01); *G06F 1/1669* (2013.01); *G06F 1/26* (2013.01); *G06F 3/02* (2013.01); *H02J 7/025* (2013.01)

(58) Field of Classification Search
CPC .. G06F 1/1632; G06F 1/16; G06F 3/02; H02J 7/025; H02J 7/02
(Continued)

(56) References Cited

U.S. PATENT DOCUMENTS

2004/0208681 A1   10/2004  Dechene
2005/0151727 A1*   7/2005  Kwong ................. G06F 3/0445
                                                     345/173
(Continued)

FOREIGN PATENT DOCUMENTS

JP        2010250699 A    11/2010
JP        2013025420 A     2/2013
(Continued)

OTHER PUBLICATIONS

"Surface does more. Just like you" Internet product description, retrieved on Mar. 29, 2016, 8 pages, Microsoft, retrieved from https://www.microsoft.com/surface/en-us.
(Continued)

*Primary Examiner* — Richard Isla
*Assistant Examiner* — Dung V Bui
(74) *Attorney, Agent, or Firm* — Spectrum IP Law Group LLC (57) ABSTRACT

Methods and apparatus relating to a dual side dockable keyboard base with bidirectional wireless charging function for 2 in 1 devices are described. In an embodiment, a 2 in 1 device base provides data input functionality to a tablet portion of the 2 in 1 device and/or wireless charging functionality. Other embodiments are also disclosed and claimed.

25 Claims, 11 Drawing Sheets

(51) Int. Cl.
*G06F 3/02* (2006.01)
*G06F 1/26* (2006.01)

(58) Field of Classification Search
USPC .......................................................... 320/108
See application file for complete search history.

(56) References Cited

U.S. PATENT DOCUMENTS

| | | | | |
|---|---|---|---|---|
| 2010/0225270 | A1* | 9/2010 | Jacobs | H02J 50/12 |
| | | | | 320/108 |
| 2011/0228463 | A1* | 9/2011 | Matagne | G06F 1/1649 |
| | | | | 361/679.04 |
| 2013/0088192 | A1* | 4/2013 | Eaton | H04B 5/0087 |
| | | | | 320/108 |
| 2013/0091225 | A1* | 4/2013 | Eaton | H02J 7/00 |
| | | | | 709/206 |
| 2014/0029187 | A1* | 1/2014 | Okuley | G06F 1/1662 |
| | | | | 361/679.09 |
| 2014/0063710 | A1* | 3/2014 | Myung | G06F 1/1669 |
| | | | | 361/679.4 |
| 2014/0139178 | A1 | 5/2014 | Large et al. | |
| 2014/0347799 | A1* | 11/2014 | Ono | G06F 1/1683 |
| | | | | 361/679.09 |
| 2014/0362507 | A1* | 12/2014 | Kinoshita | G06F 1/1618 |
| | | | | 361/679.09 |
| 2015/0015492 | A1 | 1/2015 | Lee | |
| 2015/0194837 | A1 | 7/2015 | Tom et al. | |
| 2016/0056659 | A1* | 2/2016 | Ma | G06F 3/0231 |
| | | | | 320/108 |
| 2016/0072327 | A1* | 3/2016 | Knutson | G06F 1/1632 |
| | | | | 320/108 |
| 2016/0090757 | A1* | 3/2016 | Aisaka | E05B 73/0082 |
| | | | | 70/58 |

FOREIGN PATENT DOCUMENTS

| | | |
|---|---|---|
| JP | 2019-517047 A | 6/2019 |
| WO | 2017/171877 A1 | 10/2017 |

OTHER PUBLICATIONS

"Surface Book—The Ultimate Laptop" Internet product description, retrieved on Mar. 29, 2016, 22 pages, Microsoft, retrieved from https://www.microsoft.com/surface/en-us/devices/surfact-book.

"Surface Pro 4—Power Through Your Day" Internet product description, retrieved on Mar. 29, 2016, 21 pages, Microsoft, retrieved from https://www.microsoft.com/surface/en-us/devices/surfact-pro-4.

"XPS 12 2-in1 Laptop" Internet product description, retrieved on Mar. 29, 2016, 18 pages, Dell, retrieved from http://www.dell.com/us/p/xps-12-9250/pd?ref=PD_OC.

International Preliminary Report on Patentability received for International Application No. PCT/US2016/025743, dated Oct. 11, 2018, 12 pages.

International Search Report and Written Opinion received for International Application No. PCT/US2016/025743, dated Dec. 27, 2016, 15 pages.

JP Office action dated Mar. 19, 2020, for JP Patent Application No. 2018-549323.

JP Notice of Allowance dated Oct. 20, 2020, for JP Patent Application No. 2018-549323.

CN Associate's letter and Office Action issued by the Chinese Office Action dated Oct. 9, 2021.

* cited by examiner

DUAL SIDE DOCKABLE KEYBOARD BASE WITH BI-DIRECTIONAL WIRELESS CHARGING FUNCTION FOR 2 IN 1 DEVICES

FIELD

The present disclosure generally relates to the field of electronics. More particularly, an embodiment relates to a dual side dockable keyboard base with bi-directional wireless charging function for 2 in 1 devices.

BACKGROUND

Inductive or magnetic resonance wireless charging devices are emerging as a promising technology to replace traditional wired chargers for portable computing devices.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

Some embodiments relate to a dual side dockable keyboard base with bi-directional wireless charging function for 2 in 1 devices. One or more embodiments provide an improved wireless charging and/or an improved usability experience on 2 in 1 devices for users. In an embodiment, a 2 in 1 device base that provides wireless charging functionality and/or data input functionality to a tablet portion of the 2 in 1 device.

As discussed herein, a 2 in 1 device generally refers to a device which includes a first portion referred to as a base and a second portion referred to as a tablet. Furthermore, a 2 in 1 device may operate in at least two modes; namely, a tablet mode or a laptop mode. In the tablet mode, a user interacts with the second portion mentioned above, where the second portion includes a flat panel display device (such as a Liquid Crystal Display (LCD)) which displays images. The flat panel display device may be a touch display, e.g., to receive touch input from a user or a device (such as a pen). The base of a 2 in 1 device may also receive input from other devices such as a keyboard or a mouse, or trackpad either via a wired connection or a wireless connection (such as WiFi (Wireless Fidelity) or Bluetooth™ communication). The input received at the base may then be forwarded to the tablet portion for further processing.

Furthermore, some 2 in 1 devices may include a mobility base operating as a keyboard base without any other function. 2 in 1 devices may also use a performance base which is an enhanced version of the mobility base with an additional battery and/or one or more IO (Input Output or I/O) ports. The performance base can be thicker and heavier than the basic mobility base. One or more embodiments provide a base with more functionality than the performance or mobility bases, e.g., by making the base dual sided and/or dockable so that both surfaces of the base can be utilized. In an embodiment, a 2 in 1 device utilizing the dual side base may also provide a roll-in and roll-out docking mechanisms (the round area on the cradle 102 of the 2 in 1 device shown in FIG. 1).

Also, as discussed herein, bi-directional wireless charging generally refers to the ability of a device to receive wireless charging energy (e.g., to operate one or more of its components or to charge its own battery) as well as providing wireless charging energy to a different device.

Figure 1:
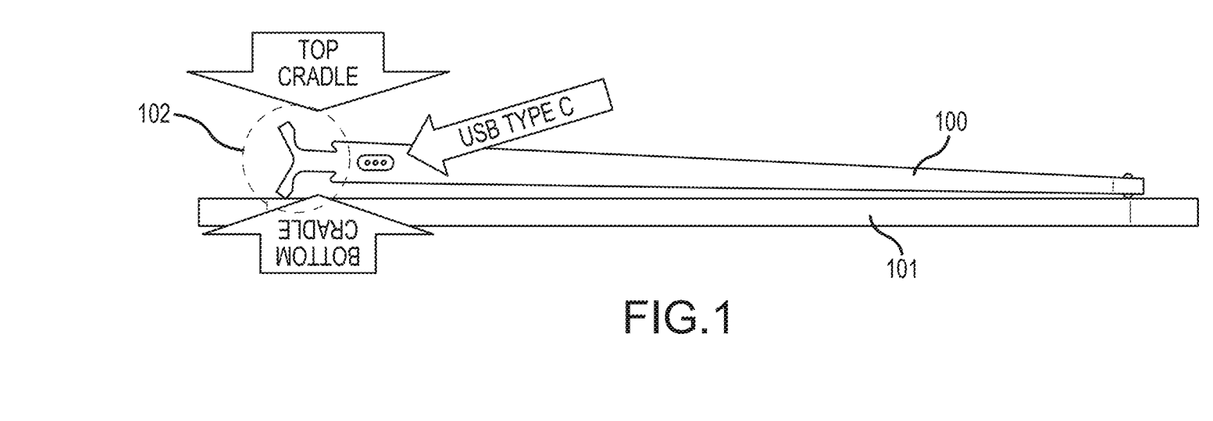
FIGS. 1-16 illustrate various views of a dual side dockable keyboard base with bi-directional wireless charging function for 2 in 1 devices, according to some embodiments.

Referring to FIG. 1, a left side view of a dual side dockable base 100 is illustrated, according to an embodiment. FIG. 1 shows the base 100 sitting on a desk/desktop 101. As mentioned above, the rounded area on the cradle 102 can be used to provide a roll-in and roll-out docking function. As shown, base 100 may include a USB (Universal Serial Bus) type C (or other types of communication and/or power connections (not shown)). The USB type C port may provide power and/or communication to the base 100 via a wired connection (not shown).

Figure 2:
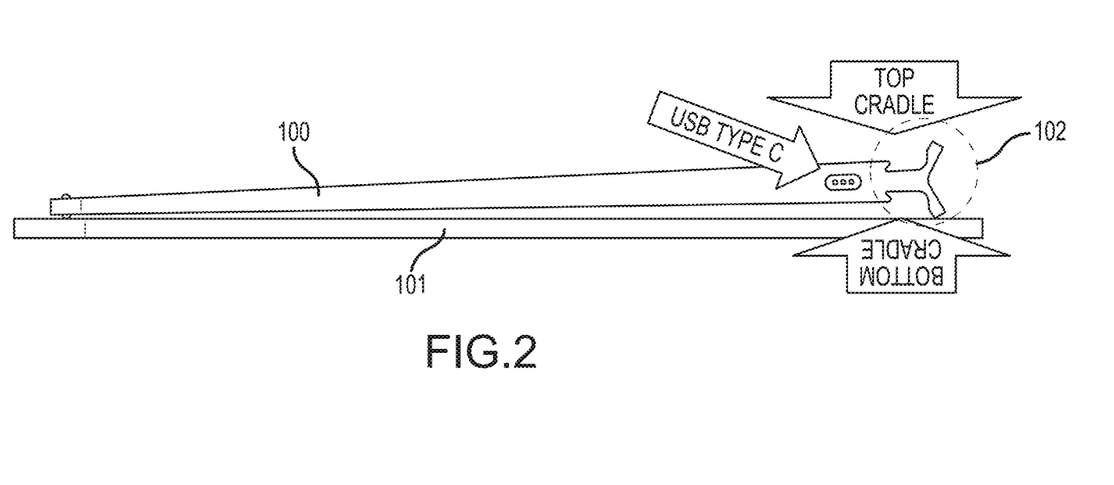
Figure 3:
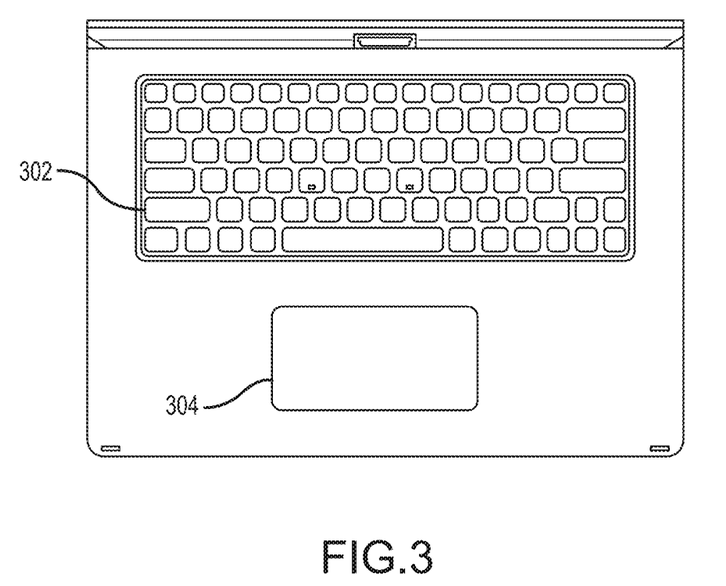
Figure 4:
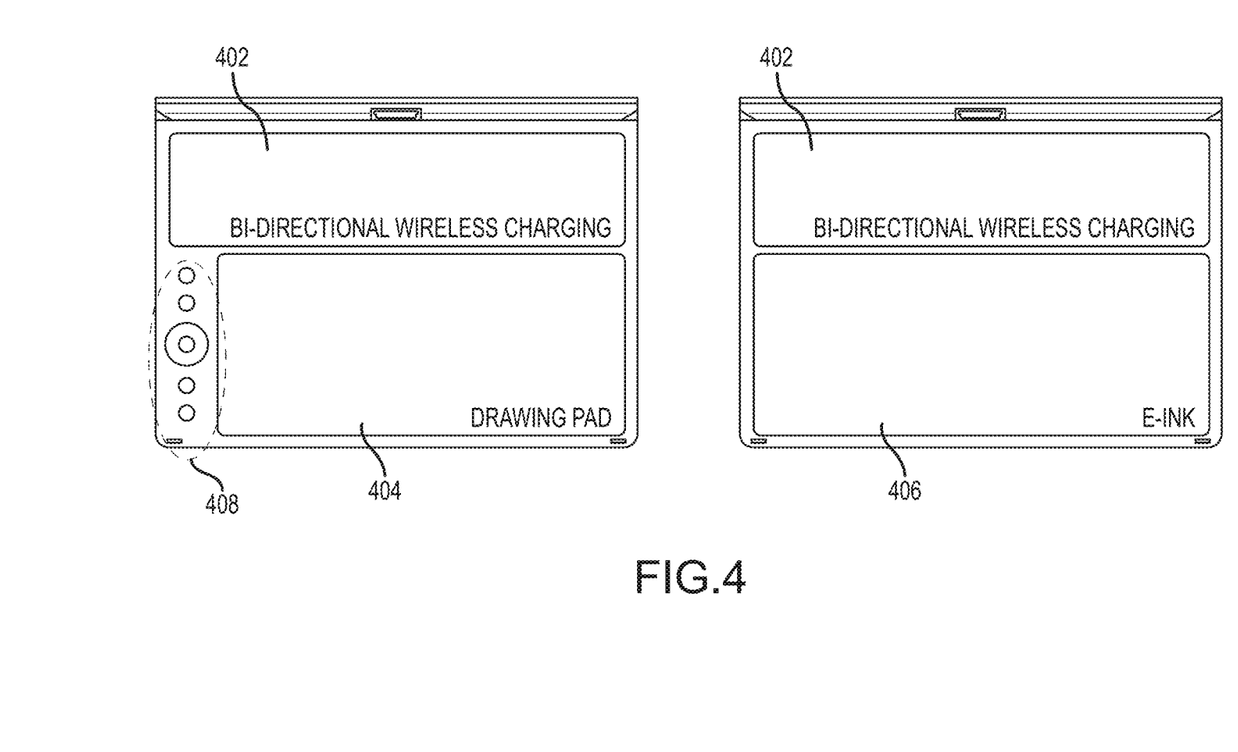

FIG. 2 illustrates a right side view of the dual side dockable base 100, according to an embodiment. Moreover, the dual side dockable base 100 may be used as a 2 in 1 keyboard/trackpad base with a cradle 102 that holds its tablet or other devices on both sides (see, e.g., FIGS. 1-2). The top side of the keyboard base may be equipped with a keyboard 302 and/or a trackpad 304 (see, e.g., FIG. 3 which illustrates a top view of the base 100, according to an embodiment), while the bottom side of the base 100 (see, e.g., FIG. 4 which illustrates a top view of the bottom side of the base 100, according to an embodiment) may be equipped with one or more other modules such as one or more of: a bi-directional wireless charging pad 402 and/or any type of input device, such as a drawing pad (404), electronic ink or e-ink (406), a trackpad (not shown), a whiteboard (not shown), or any other item (e.g., that is flat and/or without physical intrusions) so that the base may be kept smooth and clean outside. The bottom side of the base 100 may also include one or more general-purpose (e.g., configurable and/or fixed) buttons 408.

In various embodiments, both sides of the base 100 may be equipped with USB type-C connectors (FIG. 1 or 2) making the wired charging and device connecting experience the same from either sides of the dual side base, utilizing the reversible design of this connector. FIG. 5-8 show embodiments from different views and user modes. Moreover, internally, the base 100 may include one or more components to support the devices provided on the two sides of the base 100, such as the component(s) discussed with reference to FIGS. 17-18.

Figure 5:
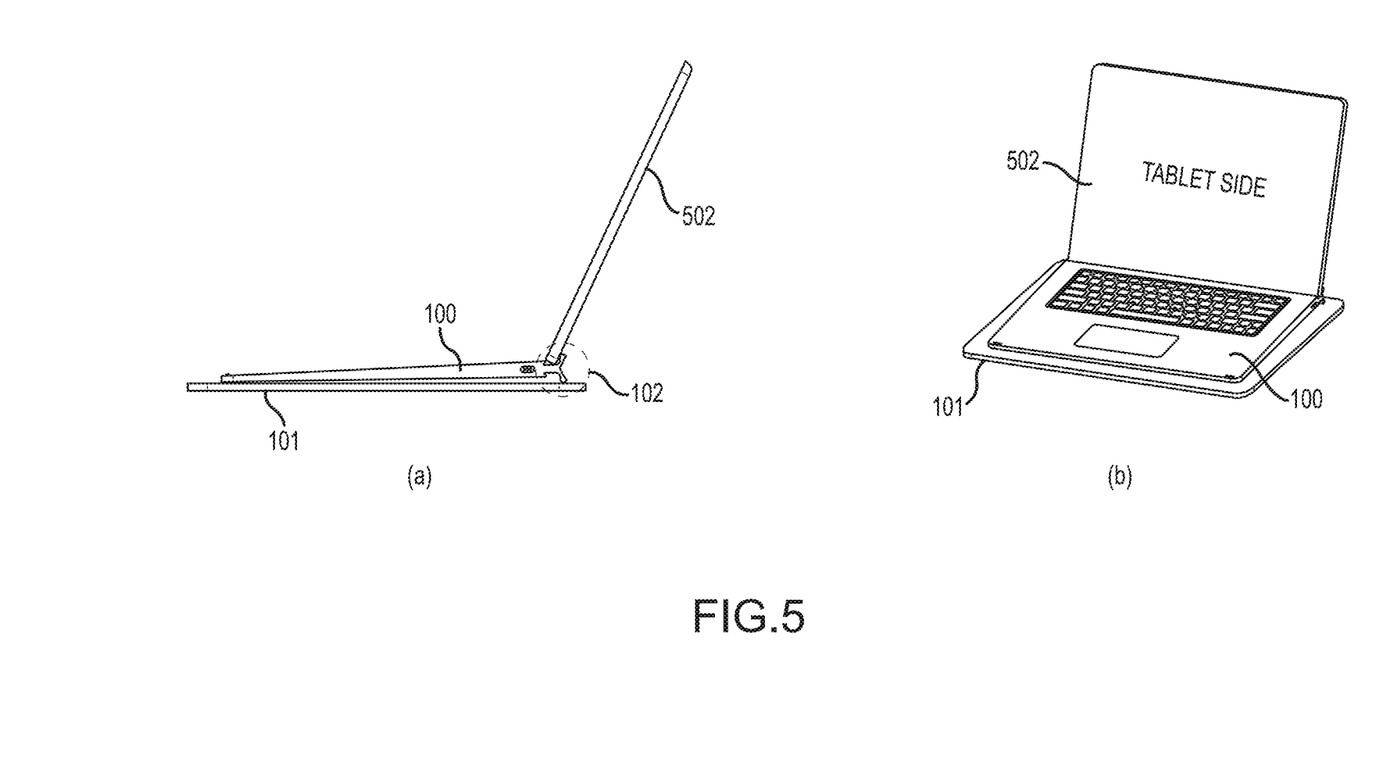
Figure 6:
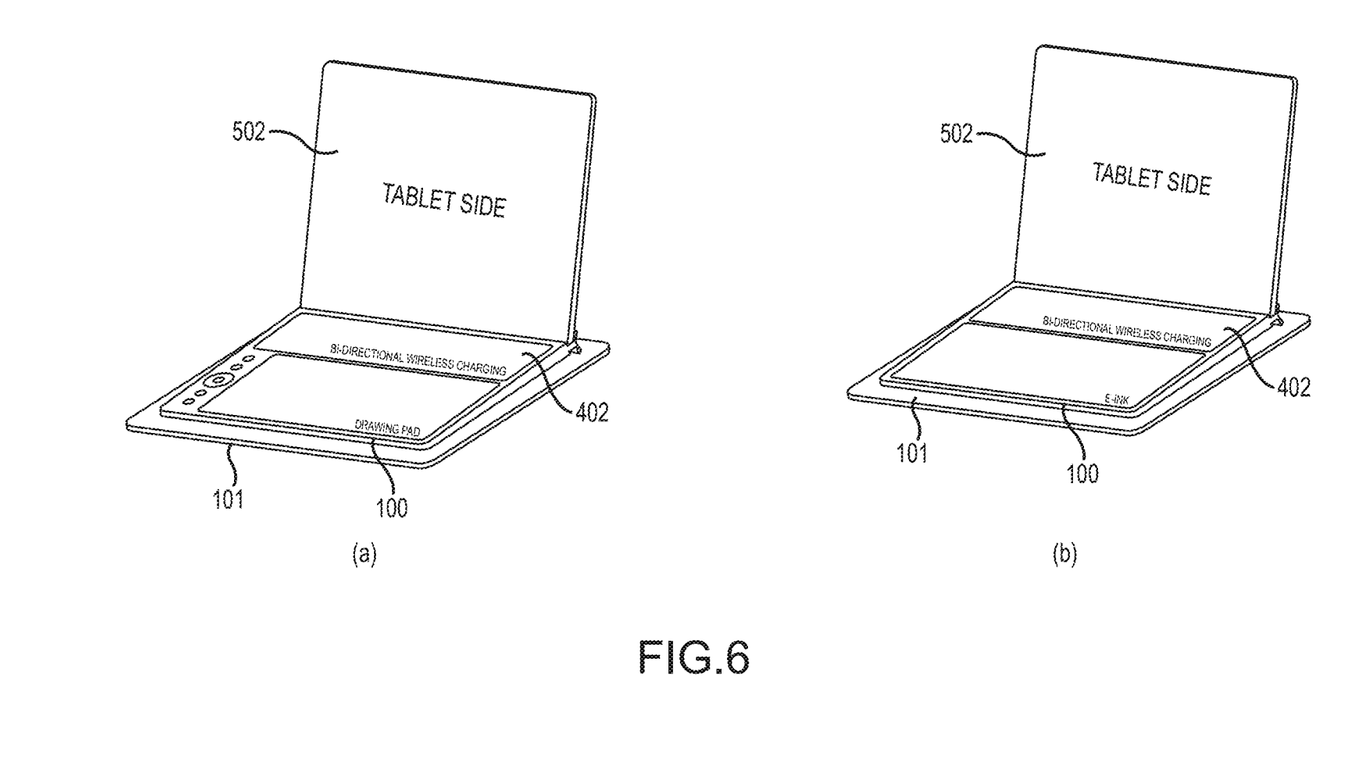

FIG. 5 illustrates the keyboard side of the base 100, facing up with tablet 502 docked, side view (a) and perspective view (b), respectively, according to some embodiments. FIG. 6 illustrates perspective views of the combination of the base 100 and tablet 502 with the bottom side of the base facing up and the tablet portion docked, according to some embodiments. As shown, the wireless charging module 402 is placed at the rear side (closer to the cradle) and the input portion (e.g., the drawing board/pad (a) or E-ink (b)) at the front of the surface (away from the cradle).

Figure 7:
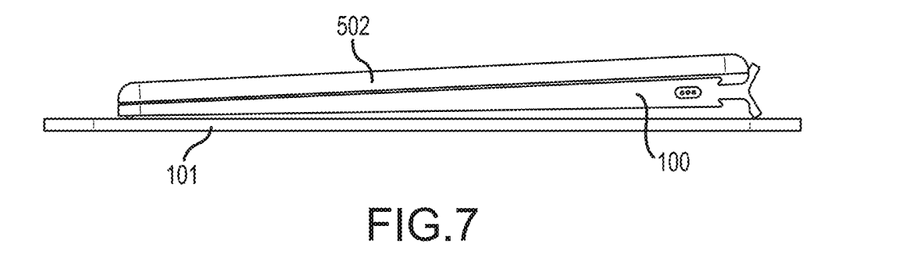
Figure 8:
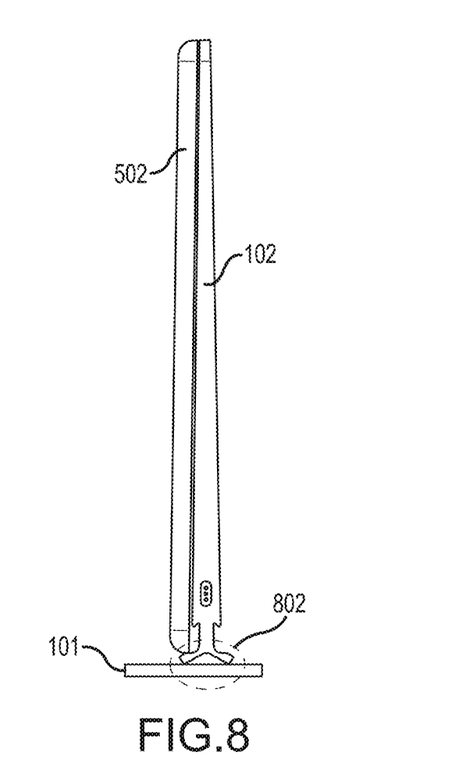

FIG. 7 illustrates the tablet 502 in a closed position and restring on the base 100, according to an embodiment. FIG. 8 illustrates a 2 in 1 in a vertical/standing mode, according to an embodiment. As shown, the system can be vertically balanced with its special cradle design (where the cradle's end 802 acts as a stand).

Figure 9:
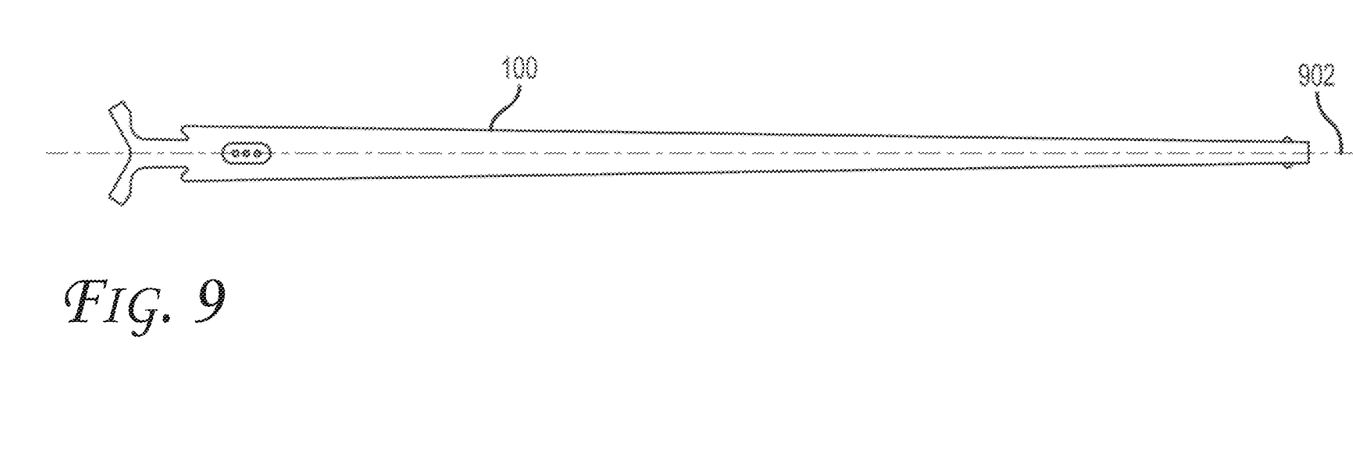

FIG. 9 illustrates a fully symmetric design of the base 100, according to an embodiment. The dotted line 902 shows the centerline of the base 100. With both sides of the base utilized, the original typing experience would not be sacrificed while the other side provides additional functions without connecting to other external devices. Another uniqueness of some embodiments is its fully symmetric design, for example, where the rubber cushions, connectors, and/or geometries are mirrored to the centerline 902, creating a harmonic look and smooth feel (e.g., in terms of its physical appearance or dimensions, e.g., allowing the vertical mode shown in FIG. 8) when viewing it from both sides.

Moreover, some current laptop devices do not have this kind of design, e.g., due to limitations on hinges or since their back side surfaces are frequently designed with doors or access panels for replacing memory, communication cards, disk drives, etc. For detachable 2 in 1s, the functionality of a keyboard base becomes even less than laptops, since their main logic boards are moved to the tablet side. By contrast, with the dual side docking design, the keyboard base can be more valuable than the current designs.

Figure 10:
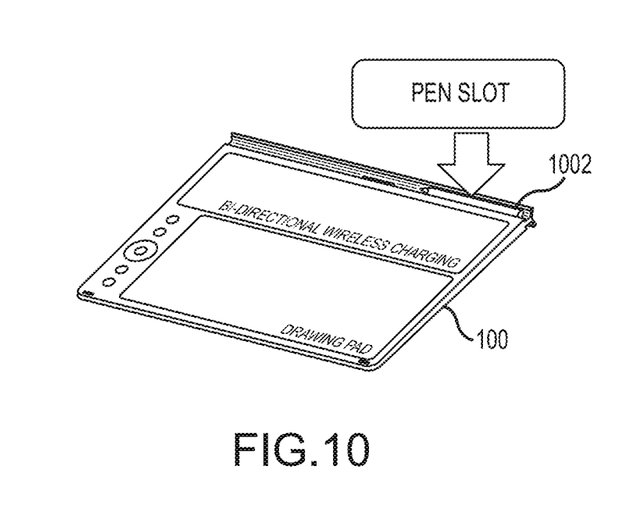
Figure 11:
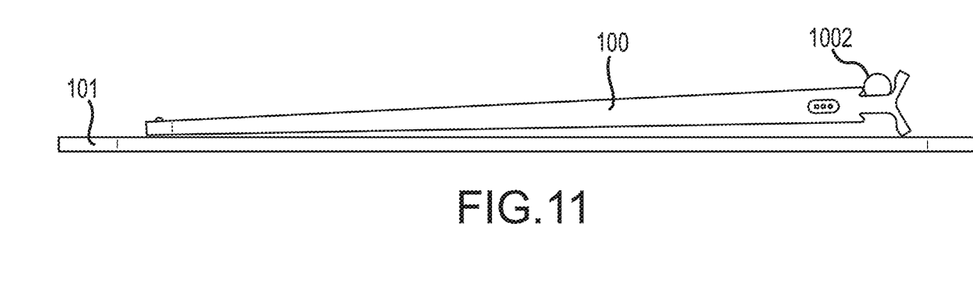
Figure 12:
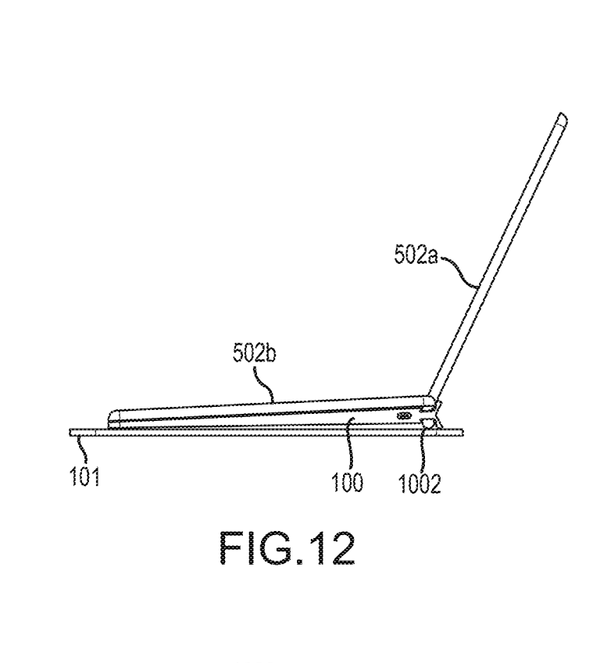

FIG. 10 illustrates placement of a digital pen 1002 (e.g., on either side of the cradle), according to an embodiment. FIG. 11 shows a side view of the position of the digital pen 1002 position on the cradle, according to an embodiment. FIG. 12 illustrates a side view of the position of the digital pen 1002 with the tablet 502 docked (502a) or closed (502b), according to one embodiment. Hence, one or more embodiments utilize the empty side of the cradle as a digital pen slot. For example, the tablet can be secured on either surfaces by the attraction force generated by magnets on the base side (e.g., at the cradle 102 and/or the pen 1002). In various embodiments, the cradle and/or the pen may include magnets and/or include metallic material to be attracted by the magnet form the other item. The surface without the tablet will then become a suitable location for a pen, and it may provide an available slot without having to share the space with the tablet. Another benefit of this design is that the pen slot would not use any space inside the chassis, like traditional PDA or smart phone pen slot designs and possibly grow the dimensions of the device. Hence, such a design would utilize the existing spaces and/or magnets (or another feature such as a physical feature to lock in the pen and/or prevent the pen from disengaging from the base) on the cradle and converts into a nice pen holding mechanism.

Figure 13:
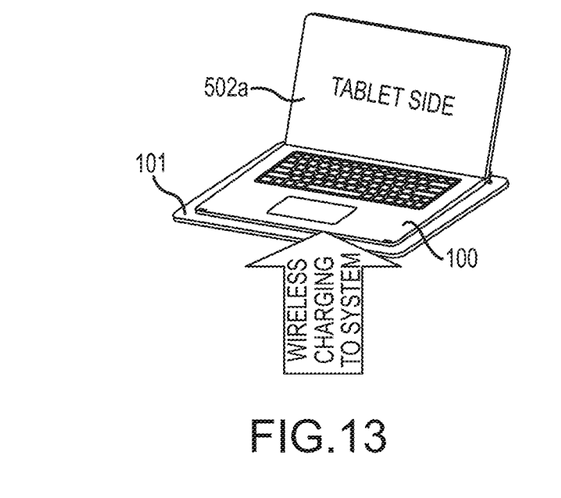

FIG. 13 illustrates a 2 in 1 device in laptop mode, according to an embodiment. As shown, the 2 in 1 has its lid up (502a) and the base 100 down. The wireless charging coil 402 faces towards the desk 101 and can be charged with the a power transmission unit (e.g., via a wireless charging pad placed on the desk (not shown)), as will be further discussed with reference to FIG. 17. Accordingly, the wireless charging module 402 receives power in this mode.

Figure 14:
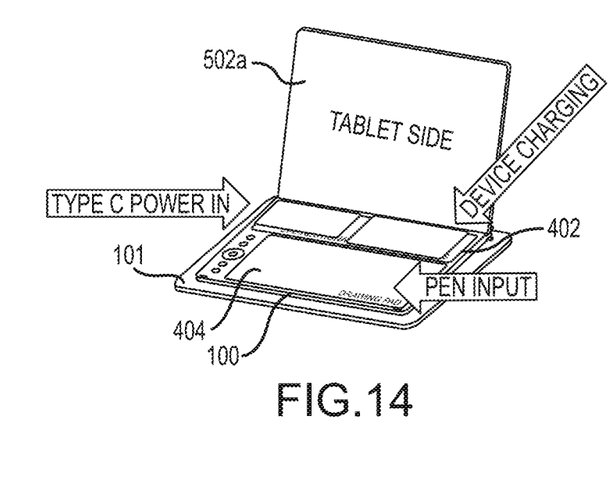

FIG. 14 illustrates a 2 in 1 device in drawing pad mode, according to one embodiment. As shown, the 2 in 1 has its lid up (502a) with the base side flipped. With the drawing pad 404, users will be able to do sketches on the base at the same time they are able to charge their phones or wearable devices (or other external device capable of being wirelessly charged such as the digital pen discussed with reference to FIGS. 10-12). Power cable is plugged in to provide system power (e.g., using the USB type C port and/or another power connector). The wireless charging module 402 delivers wireless charging energy in this mode.

Figure 15:
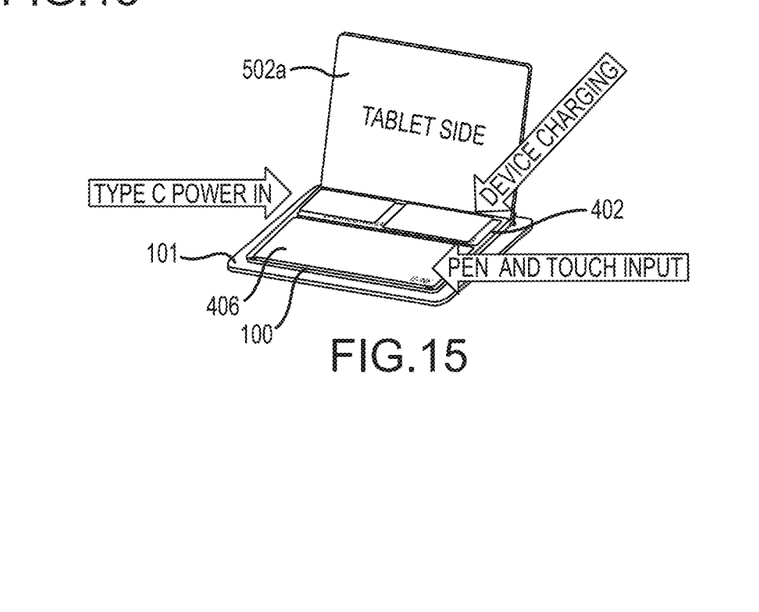

FIG. 15 illustrates a 2 in 1 device in e-ink mode, according to one embodiment. As shown, the 2 in 1 has its lid up (502a) with the base side flipped. With the e-ink display 406, users will be able to do sketches or view gray scale messages on the base at the same time they are able to charge their phones or wearable devices. The e-ink panel can also be the input device on this side, with different keys and/or buttons displayed on it (e.g., using the USB type C port and/or another power connector). The wireless charging module 402 delivers wireless charging energy in this mode.

Furthermore, the base with e-ink may be an independent system, e.g., without the tablet if the base has an installed (e.g., low power) processor, such as an Atom® or Edison™ processors. Such a processor may provide basic computing power for minor tasks, such as web browsing, fiction reading, and/or emailing. It may also be coupled to other devices via Bluetooth™ (or other wireless communication) and turn into an external keyboard.

Figure 16:
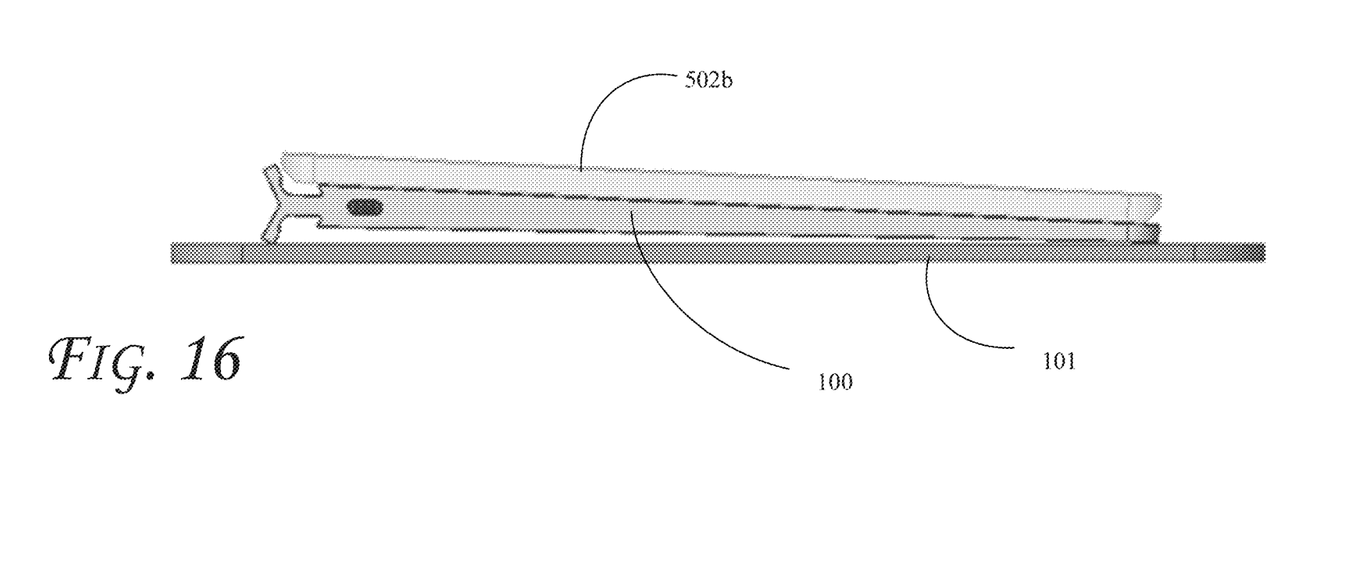

FIG. 16 illustrates a side view of a 2 in 1 device in tablet (wireless charging) mode, according to one embodiment. For example, users can use wireless charging from the base 100 to charge the tablet 502b during usage or storage, e.g., by just laying the tablet on the bottom surface for coil induction. In turn, the tablet can be charged by the base with a slanted angle for viewing and/or touch input (or pen drawing). The wireless charging module 402 receives wireless energy in this mode.

While a plurality of application examples are discussed herein for the opposite side of the physical keyboard surface of the base, this surface may be equipped with any other function(s) and/or module(s) that helps increase productivity or usability. Also, there may be a physical connector to electrically couple the base 100 and the tablet 502 (e.g., for data communication and/or power transfer). Hence, wireless charging of the base may allow for power transfer to the tablet via the connector and/or inductive power transfer via the cradle.

Figure 17:
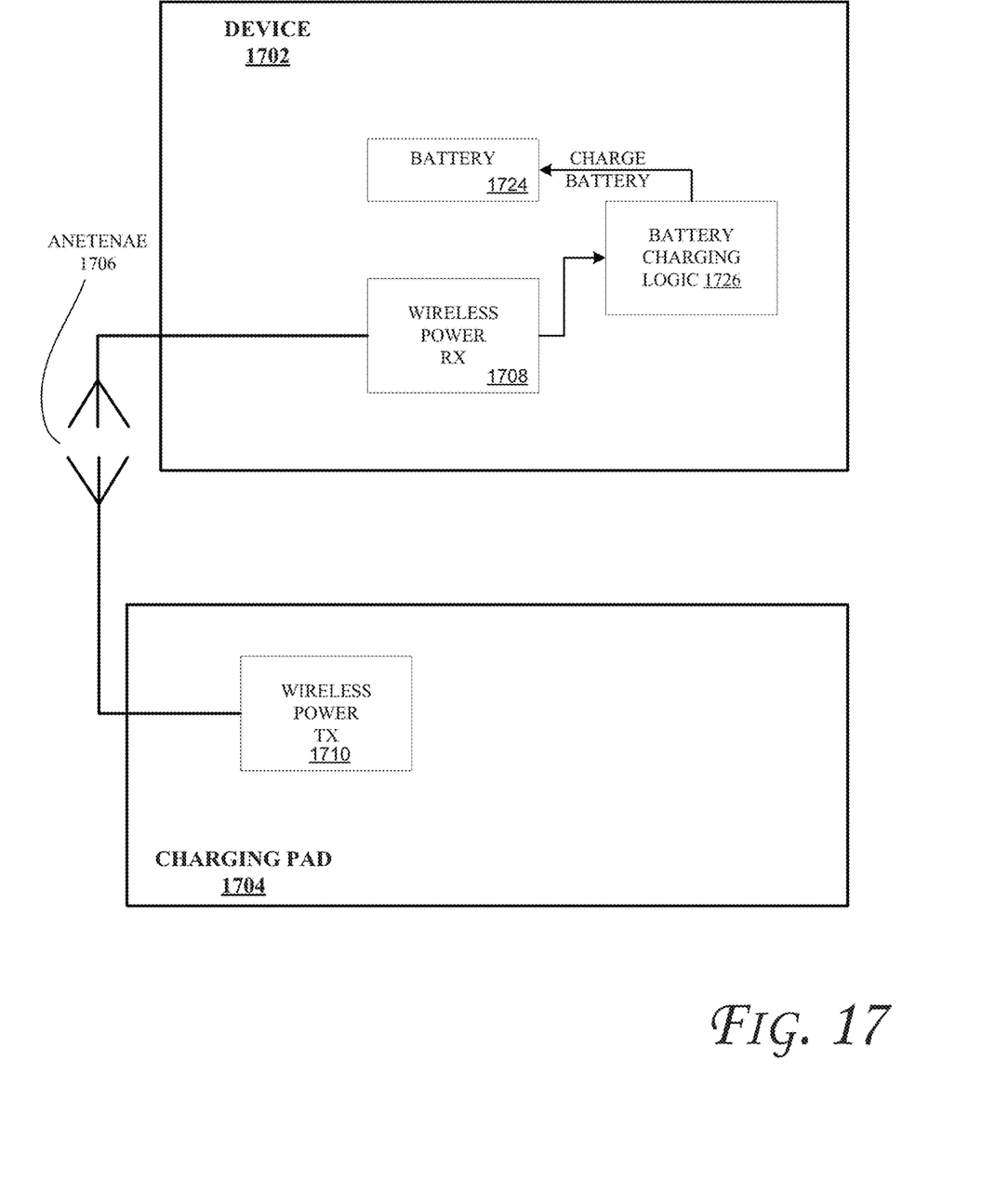
FIGS. 17 and 18 illustrate block diagrams of embodiments of systems, which may be utilized in various embodiments discussed herein.

FIG. 17 shows a block diagram of a computing system 1700 with wireless charging capability, according to an embodiment. In one embodiment, components discussed with reference to any of the previous figures (such as the base 100 and/or the tablet 502) may include one or more components of FIG. 17 to facilitate (e.g., bi-directional) wireless charging. System 1700 includes a device 1702 and a charging pad 1704. Antennae 1706 (e.g., at least one for each device 1702 and pad 1704) enable wireless transmission of electromagnetic energy/waves from the charging pad 1704 to the device 1702 to allow for wireless charging. In an embodiment, device 1702 is incorporated into a computing device, such as a mobile or portable computing device. The portable computing device may be a 2:1 system (such as discussed with reference to FIGS. 1-16), smartphone, tablet, UMPC (Ultra-Mobile Personal Computer), laptop computer, Ultrabook™ computing device, wearable devices (such as smart watch, smart glasses, smart bracelets, and the like (such as those discussed with reference to FIG. 18). The battery 1724 of the device 1702 (and/or the wireless power received via wireless power receiver 1708 or from battery charging logic 1726) may then be used to provide power to (or assist in charging) the portable computing device.

As shown in FIG. 17, device 1702 includes a wireless power receiver (RX) 1708 to receive electromagnetic waves (through one of antennae 1706 directly coupled to the RX 1708) and charging pad 1704 includes a wireless power transmitter (TX) 1710 to transmit the electromagnetic waves (through one of antennae 1706 directly coupled to TX).

Figure 18:
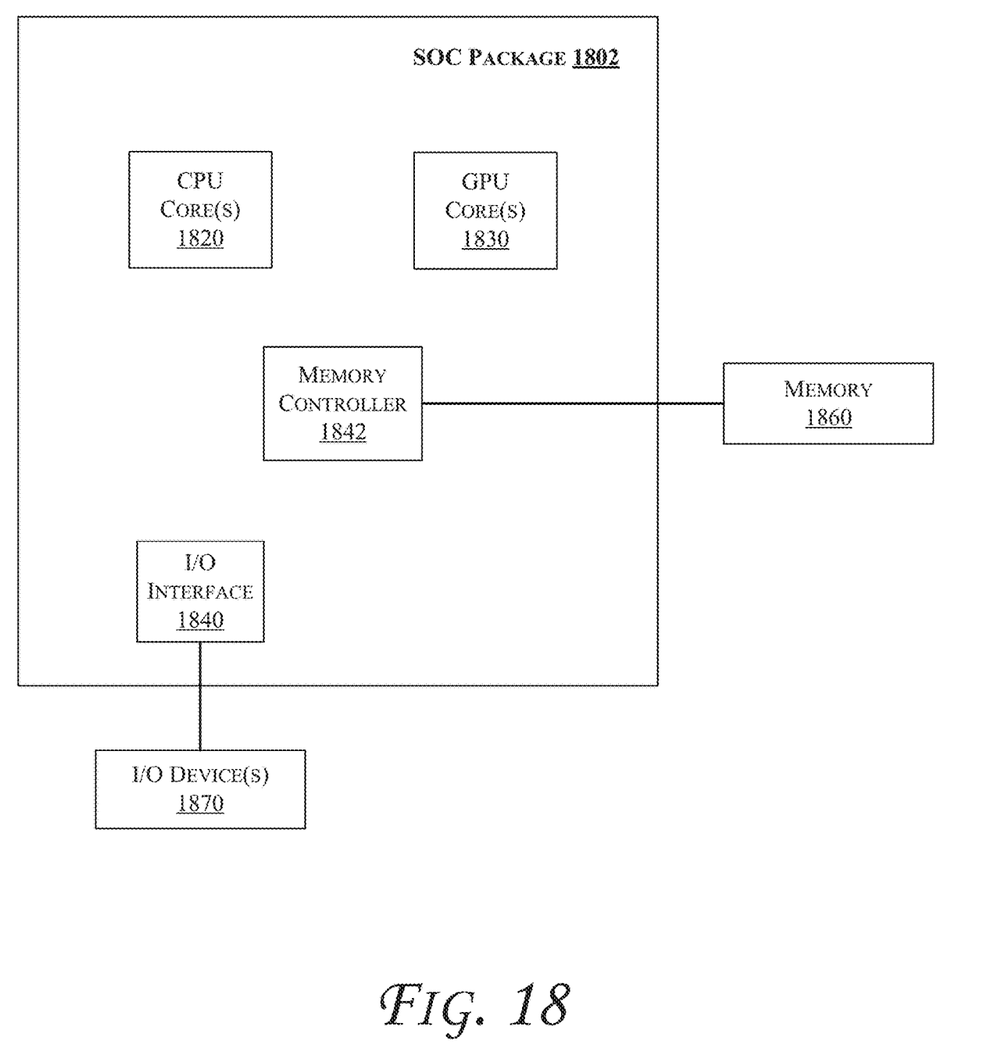

Also, the computing devices discussed herein (e.g., device 1702) that are capable of being charged via wireless charging can be embodied as a System On Chip (SOC) device. FIG. 18 illustrates a block diagram of an SOC package in accordance with an embodiment. As illustrated in FIG. 18, SOC 1802 includes one or more Central Processing Unit (CPU) cores 1820, one or more Graphics Processor Unit (GPU) cores 1830, an Input/Output (I/O) interface 1840, and a memory controller 1842. Various components of the SOC package 1802 may be coupled to an interconnect or bus. Also, the SOC package 1802 may include more or less components, such as those discussed herein with reference to the other figures. Further, each component of the SOC package 1820 may include one or more other components, e.g., as discussed with reference to the other figures herein. In one embodiment, SOC package 1802 (and its components) is provided on one or more Integrated Circuit (IC) die, e.g., which are packaged into a single semiconductor device.

As illustrated in FIG. 18, SOC package 1802 is coupled to a memory 1860 via the memory controller 1842. In an embodiment, the memory 1860 (or a portion of it) can be integrated on the SOC package 1802. Further, the I/O interface 1840 may be coupled to one or more I/O devices 1870, e.g., via an interconnect and/or bus. I/O device(s) 1870 may include one or more of a keyboard, a mouse, a touchpad, a display, an image/video capture device (such as a camera or camcorder/video recorder), a touch screen, a speaker, or the like.

The following examples pertain to further embodiments. Example 1 optionally may include an apparatus comprising: a base having a first surface and a second surface, wherein the base is to provide data input functionality to a tablet and wireless charging functionality, wherein the first surface is to include an input device to provide the data input functionality and the second surface is to include a wireless charging pad to provide the wireless charging functionality, wherein a first end of the base is to comprise a dual sided cradle capable to receive the tablet portion on either side of the dual sided cradle. Example 2 optionally may include the apparatus of example 1 or any other example discussed herein, wherein the base is to be tapered from the first end of the base to a second end of the base to provide an elevation difference between the first end and the second end when the base is placed on a surface. Example 3 optionally may include the apparatus of example 2 or any other example discussed herein, wherein the first end of the base is to be higher than the second end of the base. Example 4 optionally may include the apparatus of example 2 or any other example discussed herein, wherein the surface is comprise a desktop or a user's lap. Example 5 optionally may include the apparatus of example 1 or any other example discussed herein, wherein the dual sided cradle is capable to receive a digital pen on either side of the dual sided cradle. Example 6 optionally may include the apparatus of example 5 or any other example discussed herein, wherein the dual sided cradle is to physically or magnetically engage the digital pen. Example 7 optionally may include the apparatus of example 1 or any other example discussed herein, wherein the input device is to comprise one or more of: a keyboard or a trackpad. Example 8 optionally may include the apparatus of example 1 or any other example discussed herein, wherein the wireless charging pad is to provide bi-directional wireless charging. Example 9 optionally may include the apparatus of example 1 or any other example discussed herein, wherein the base is to comprise at least one Universal Serial Bus (USB) type C connector to facilitate data communication and supply of power to one or more components of the base or the tablet. Example 10 optionally may include the apparatus of example 1 or any other example discussed herein, wherein the base is to comprise a battery to be charged via energy to be received at the wireless charging pad. Example 11 optionally may include the apparatus of example 1 or any other example discussed herein, wherein the second surface is to further comprise a second input device. Example 12 optionally may include the apparatus of example 11 or any other example discussed herein, wherein the second input device is to comprise one or more of: a drawing pad, an electronic ink, or one or more buttons. Example 13 optionally may include the apparatus of example 12 or any other example discussed herein, wherein the one or more buttons are fixed or configurable. Example 14 optionally may include the apparatus of example 1 or any other example discussed herein, wherein the first surface is on an opposite side of the second surface. Example 15 optionally may include the apparatus of example 1 or any other example discussed herein, wherein the base is to include a connector to provide a physical coupling between the base and the tablet once the tablet is docked into one side of the dual sided cradle, wherein the connector is to provide data or power transfer support between the base and the tablet. Example 16 optionally may include the apparatus of example 1 or any other example discussed herein, wherein the base is to have symmetrical physical features about a center line of the base. Example 17 optionally may include the apparatus of example 1 or any other example discussed herein, wherein the wireless charging pad is capable to charge one or more external devices.

Example 18 optionally may include an apparatus comprising: a base having a first surface and a second surface, wherein the base is to provide data input functionality to a tablet and wireless charging functionality, wherein the first surface is to include an input device to provide the data input functionality and the second surface is to include a wireless charging pad to provide the wireless charging functionality. Example 19 optionally may include the apparatus of example 18 or any other example discussed herein, wherein the base is to be tapered from the first end of the base to a second end of the base to provide an elevation difference between the first end and the second end when the base is placed on a surface. Example 20 optionally may include the apparatus of example 19 or any other example discussed herein, wherein the first end of the base is to be higher than the second end of the base. Example 21 optionally may include the apparatus of example 19 or any other example discussed herein, wherein the surface is comprise a desktop or a user's lap. Example 22 optionally may include the apparatus of example 18 or any other example discussed herein, wherein the input device is to comprise one or more of: a keyboard or a trackpad. Example 23 optionally may include the apparatus of example 18 or any other example discussed herein, wherein the wireless charging pad is to provide bi-directional wireless charging. Example 24 optionally may include the apparatus of example 18 or any other example discussed herein, wherein the base is to comprise at least one USB type C connector to facilitate data communication and supply of power to one or more components of the base or the tablet. Example 25 optionally may include the apparatus of example 18 or any other example discussed herein, wherein the base is to comprise a battery to be charged via energy to be received at the wireless charging pad.

Example 26 optionally may include a computing system comprising: a battery to store electrical energy; and a base, coupled to the battery, the base to comprise a first surface and a second surface, wherein the base is to provide data input functionality to a tablet and wireless charging functionality, wherein the first surface is to include an input device and the second surface is to include a wireless charging pad. Example 27 optionally may include the system of example 26 or any other example discussed herein, wherein the base is to be tapered from the first end of the base to a second end of the base to provide an elevation difference between the first end and the second end when the base is placed on a surface. Example 28 optionally may include the system of example 27 or any other example discussed herein, wherein the first end of the base is to be higher than the second end of the base. Example 29 optionally may include the system of example 27 or any other example discussed herein, wherein the surface is comprise a desktop or a user's lap. Example 30 optionally may include the system of example 26 or any other example discussed herein, wherein the input device is to comprise one or more of: a keyboard or a trackpad. Example 31 optionally may include the system of example 26 or any other example discussed herein, wherein the wireless charging pad is to provide bi-directional wireless charging. Example 32 optionally may include the system of example 26 or any other example discussed herein, wherein the base is to comprise at least one USB type C connector to facilitate data communication and supply of power to one or more components of the base or the tablet.

Example 33 optionally may include an apparatus comprising means to perform a method as set forth in any example discussed herein.

In various embodiments, the operations discussed herein, e.g., with reference to FIGS. 1-18, may be implemented as hardware (e.g., logic circuitry), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIGS. 1-18.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a base having a first surface and a second surface, wherein the base is to provide a data input functionality to a tablet and a wireless charging functionality,
wherein the first surface is to include an input device to provide the data input functionality and the second surface is to include a wireless charging pad to provide the wireless charging functionality, wherein a first end of the base comprises a dual sided cradle capable to receive the tablet on either side of the dual sided cradle, wherein a round area of the dual sided cradle at the first end of the base is to provide a roll-in and roll-out docking mechanism for the tablet to respectively engage and disengage the base, wherein the dual sided cradle is to have symmetrical physical features about a center line of the base, wherein the symmetrical physical features comprise at least two elongated features, wherein the two elongated features are to extend in opposite directions from the center line of the base to form the dual sided cradle, wherein the symmetrical physical features are to provide three surfaces, wherein two surfaces of the three surfaces are to provide the roll-in and roll-out docking mechanism and a third surface of the three surfaces, disposed between the two surfaces, is to allow the base to rest vertically on a desk or desktop.

2. The apparatus of claim 1, wherein the base is to be tapered from the first end of the base to a second end of the base to provide an elevation difference between the first end and the second end when the base is placed on a surface.

3. The apparatus of claim 2 wherein the first end of the base is to be higher than the second end of the base.

4. The apparatus of claim 2, wherein the surface comprises a desktop or a user's lap.

5. The apparatus of claim 1, wherein the dual sided cradle is capable to receive a digital pen on either side of the dual sided cradle.

6. The apparatus of claim 5, wherein the dual sided cradle is to physically or magnetically engage the digital pen.

7. The apparatus of claim 1, wherein the input device comprises one or more of: a keyboard or a trackpad.

8. The apparatus of claim 1, wherein the wireless charging pad is to provide bi-directional wireless charging.

9. The apparatus of claim 1, wherein the base comprises at least one Universal Serial Bus (USB) type C connector to facilitate data communication and supply of power to one or more components of the base or the tablet.

10. The apparatus of claim 1, wherein the base comprises a battery to be charged via energy to be received at the wireless charging pad.

11. The apparatus of claim 1, wherein the second surface further comprises a second input device.

12. The apparatus of claim 11, wherein the second input device comprises one or more of: a drawing pad, an electronic ink, or one or more buttons.

13. The apparatus of claim 12, wherein the one or more buttons are fixed or configurable.

14. The apparatus of claim 1, wherein the first surface is on an opposite side of the second surface.

15. The apparatus of claim 1, wherein the base includes a connector to provide a physical coupling between the base and the tablet once the tablet is docked into one side of the dual sided cradle, wherein the connector is to provide data or power transfer support between the base and the tablet.

16. The apparatus of claim 1, wherein the base is to have symmetrical physical features about the center line of the base.

17. The apparatus of claim 1, wherein the wireless charging pad is capable to charge one or more external devices.

18. The apparatus of claim 1, wherein at least one of the two elongated features is capable to rest on a desk or desktop.

19. An apparatus comprising:
a base having a first surface and a second surface, wherein the base is to provide a data input functionality to a tablet and a wireless charging functionality,
wherein the first surface is to include an input device to provide the data input functionality and the second surface is to include a wireless charging pad to provide the wireless charging functionality, wherein a round area of the base at a first end of the base is to provide a roll-in and roll-out docking mechanism for the tablet to respectively engage and disengage the base, wherein the round area of the base at the first end of the base is to have symmetrical physical features about a center line of the base, wherein the symmetrical physical features comprise at least two elongated features, wherein the two elongated features are to extend in opposite directions from the center line of the base to form a dual sided cradle, wherein the symmetrical physical features are to provide three surfaces, wherein two surfaces of the three surfaces are to provide the roll-in and roll-out docking mechanism and a third surface of the three surfaces, disposed between the two surfaces, is to allow the base to rest vertically on a desk or desktop.

20. The apparatus of claim 19, wherein the base is to be tapered from the first end of the base to a second end of the base to provide an elevation difference between the first end and the second end when the base is placed on a surface.

21. The apparatus of claim 20, wherein the first end of the base is to be higher than the second end of the base.

22. The apparatus of claim 20, wherein the surface comprises a desktop or a user's lap.

23. The apparatus of claim 19, wherein the input device comprises one or more of: a keyboard or a trackpad.

24. The apparatus of claim 19, wherein the wireless charging pad is to provide bi-directional wireless charging.

25. The apparatus of claim 19, wherein the base comprises a battery to be charged via energy to be received at the wireless charging pad.

* * * * *